No. 746,807. PATENTED DEC. 15, 1903.
J. T. FERRES.
MACHINE FOR MAKING AND CUTTING DOUBLE FACED CORRUGATED PAPER.
APPLICATION FILED MAR. 15, 1899.
NO MODEL. 6 SHEETS—SHEET 1.

No. 746,807. PATENTED DEC. 15, 1903.
J. T. FERRES.
MACHINE FOR MAKING AND CUTTING DOUBLE FACED CORRUGATED PAPER.
APPLICATION FILED MAR. 15, 1899.
NO MODEL. 6 SHEETS—SHEET 3.

Fig. 3.

Witnesses,
S. W. Brainard.
L. R. Lindby

Inventor:
Jeffrey T. Ferres
By Edward Rector
His Attorney.

No. 746,807. PATENTED DEC. 15, 1903.
J. T. FERRES.
MACHINE FOR MAKING AND CUTTING DOUBLE FACED CORRUGATED PAPER.
APPLICATION FILED MAR. 15, 1899.
NO MODEL. 6 SHEETS—SHEET 4.

Witnesses.
S.W. Brainard.
L.R. Lindley

Inventor.
Jeffrey T. Ferres
By Edward Rector
His Attorney.

No. 746,807. PATENTED DEC. 15, 1903.
J. T. FERRES.
MACHINE FOR MAKING AND CUTTING DOUBLE FACED CORRUGATED PAPER.
APPLICATION FILED MAR. 15, 1899.
NO MODEL. 6 SHEETS—SHEET 5.

Witnesses.
S. W. Brainard,
L. R. Lindley,

Inventor.
Jeffrey T. Ferres.
By Edward Rector
His Attorney.

No. 746,807.

Patented December 15, 1903.

UNITED STATES PATENT OFFICE.

JEFFREY T. FERRES, OF ANDERSON, INDIANA.

MACHINE FOR MAKING AND CUTTING DOUBLE-FACED CORRUGATED PAPER.

SPECIFICATION forming part of Letters Patent No. 746,807, dated December 15, 1903.

Application filed March 15, 1899. Serial No. 709,196. (No model.)

*To all whom it may concern:*

Be it known that I, JEFFREY T. FERRES, a citizen of the United States of America, residing at Anderson, in the county of Madison, in the State of Indiana, have invented a certain new and useful Machine for Making and Cutting Double-Faced Corrugated Paper, of which the following is a description, reference being had to the accompanying drawings, forming part of this specification.

My invention relates more particularly to the manufacture of what is commonly known as "double-faced" corrugated paper—i. e., corrugated paper having plain paper pasted upon both sides of it, forming a structure composed of three thicknesses of paper—the two outside "facings" of plain paper and the intermediate sheet of corrugated paper inclosed between them; and my invention has for its principal object the provision of improved means for applying and securing the second sheet or facing to previously-formed "single-faced" corrugated paper—i. e., composed of the corrugated sheet and a facing of plain paper secured to one side only thereof and for cutting the finished product into sheets or boards of the desired length.

In my approved apparatus a strip of single-faced corrugated paper and a strip of plain facing-paper are independently fed into the apparatus or machine, paste applied to the corrugated surface of the former, and the two strips then brought together and passed between suitable heaters by which, in conjunction with suitably-applied air-blasts to carry away the moisture, the paste is dried and the facing-strip secured to the corrugated face of the single-faced strip, thereby producing a double-faced strip, and thence onward between the feed-aprons, (by which the strips are drawn through the machine,) and thence out the delivery end of the machine beneath an intermittently-operated knife, which severs the continuous strip of double-faced paper into sheets or "boards" of the desired length. The movement of the paper through the apparatus is continuous and uninterrupted, so that the operations of applying the paste, bringing the two strips together, pressing them against each other, drying them, and cutting the completed board into the desired lengths are all performed while the paper is moving at a uniform speed through the apparatus.

The several features of my invention therefore relate more especially to what may be termed a "continuous" as distinguished from an "intermittent" operation, although some of them may be utilized in the intermittent method of operation, as will be apparent from the explanation of them hereinafter given.

In the accompanying drawings.

The same letters of reference are used to indicate corresponding parts in the several views.

Figure 1:
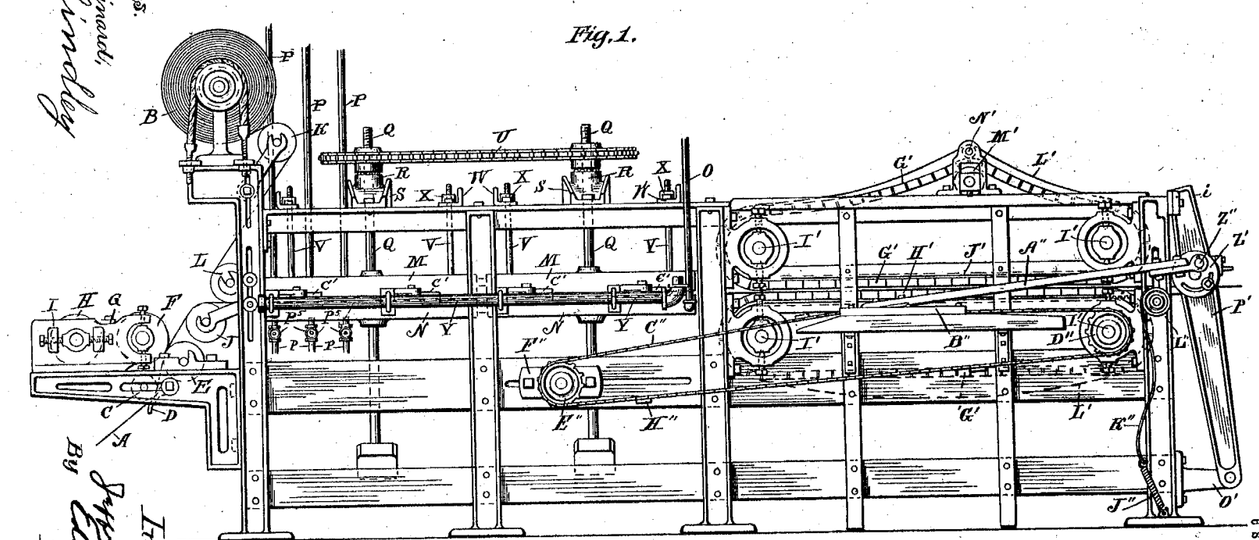
Figure 1 is a side elevation of a novel apparatus or machine by which my invention may be carried out.
Figure 2:
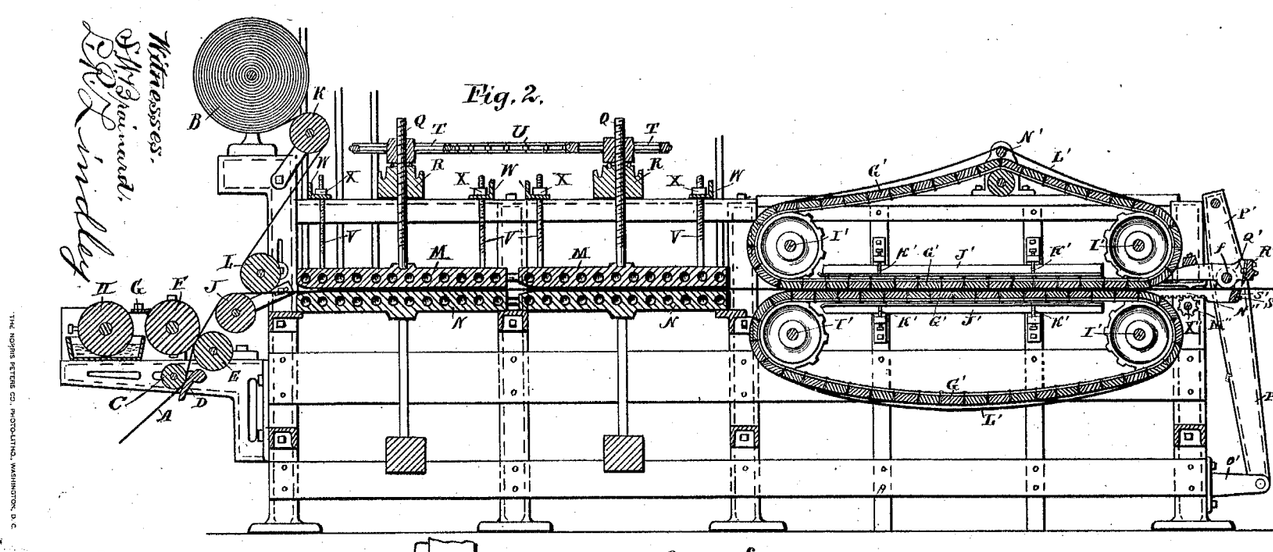
Fig. 2, a vertical longitudinal middle section of the same on the line 2 2 of Fig. 3.

The strip of single-faced corrugated paper A, which is delivered to the machine at its left-hand or forward end, Figs. 1 and 2, may be drawn from any suitable supply, as from a roll of such paper suitably supported adjacent that end of the apparatus; but in my own practice I have taken such paper direct from the machine or apparatus in which it is manufactured, such machine or apparatus being that heretofore patented to me in Letters Patent No. 545,354, of August 27, 1895, which I arrange in line with the apparatus shown in Figs. 1 and 2 and a short distance from the left-hand end thereof.

The strip of plain facing-paper which is to be applied to the corrugated surface of the strip A is carried on a supply-roll B, mounted upon the top of the machine shown in the drawings at its forward end.

Premising that both strips of paper are drawn rearward through the machine by the operation of feed or drawing aprons in the rear part of the machine, hereinafter described, the operation of the apparatus, and incidentally its construction, may be explained by following the strips of paper as they pass through the several portions of the apparatus from its front end to its rear end, as follows: For the purpose of slightly flattening the corrugations of the strip A preparatory to applying the paste I pass the strip A at its entrance to the machine between a roller C and a presser-plate D, Figs. 1 and 9, the latter being secured to a rock-shaft, which may be turned in its bearings in the framework to adjust the space between the plate D and roller C and be securely locked in adjusted position. From the roller C and plate D the strip A passes upward between the rolls E F, the latter of which is the paste-roll, and is supplied with paste over an intermediate dam G by the roll H, which is journaled in a paste trough or reservoir I, mounted upon the front end of the framework. From the pasting-roll the strip A passes upward and rearward over an idle roller J, and thence rearward into the machine and between the heaters, hereinafter described. The facing-strip B is in the present instance led rearward from the under side of its supply-roll over an idle roller K, thence downward and forward over a second roller L, and thence rearward into the machine with the strip A, the roller L being located in such position that as the strip B passes rearward around its under side it is brought into contact with and pressed against the upper pasted surface of the corrugated strip A.

The heaters between which the two strips of paper pass as they enter the machine consist of two horizontal steam-heated plates separated vertically from each other a sufficient distance to permit the strips of paper to pass freely between them, but at the same time close enough together to maintain the facing-strip in firm contact with the pasted surface of the corrugated strip, so that the two strips will be firmly and smoothly united as they become gradually dried in the passage through the machine.

In the present instance the upper heater or heater-plate is for convenience in construction and handling formed of two separate plates or sections M M and the lower heater of two like separate plates or sections N N, or the four plates or sections may be considered four separate heaters, two upper ones M M and two lower ones N N. The operation of the apparatus would not be changed by merging the two upper plates M M into a single upper plate or heater and the two lower plates N N into a single lower plate or heater nor by leaving them as they are and adding another upper and lower heater in rear of the heaters M N. Except where specific description of the parts may require I shall refer to the upper heater as a "single" element and the lower heater as a "single" element and may be understood to refer to either one or more plates which constitute the heater. My preferred construction of these heater-plates is shown in Fig. 4, where a continuous steam-pipe O is shown passed transversely in reverse bends through the body of the plate from its right-hand or rear end to its left-hand or front end. This steam-pipe is cast directly in the body of the plate, as shown, the pipe being arranged in position in the mold and the metal for the plate then poured in around it. Fig. 4 shows the two lower heater-plates N N, the space between them being bridged by a connection in the steam-pipe O, so that the latter is continuous from one end of the heater to the other. The live steam is admitted to the pipe O at the rear or right-hand end of the heater, and near its left-hand end the pipe O is provided with a plurality of exhaust-outlets P, separately controlled by suitable valves $P^5$, Figs. 1 and 3, for a purpose hereinafter described.

Figure 4:
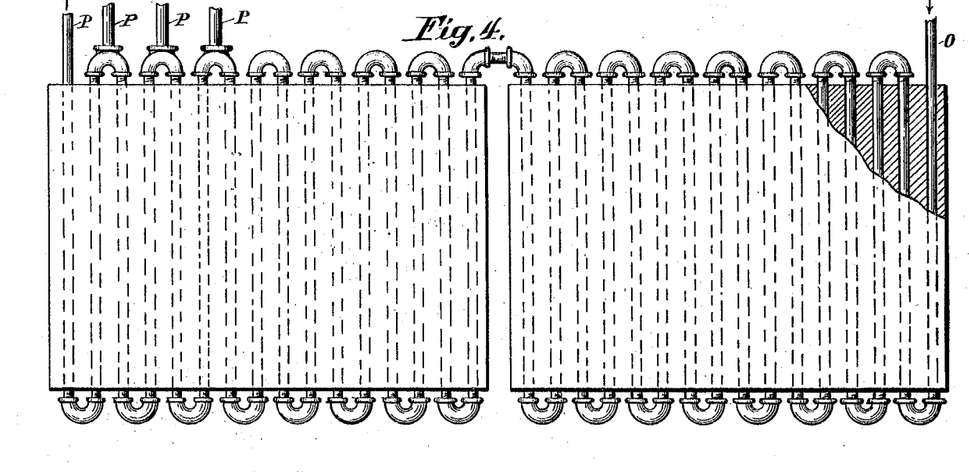
Fig. 4, an enlarged top plan view, partly in section, of the lower heater.
Figure 5:
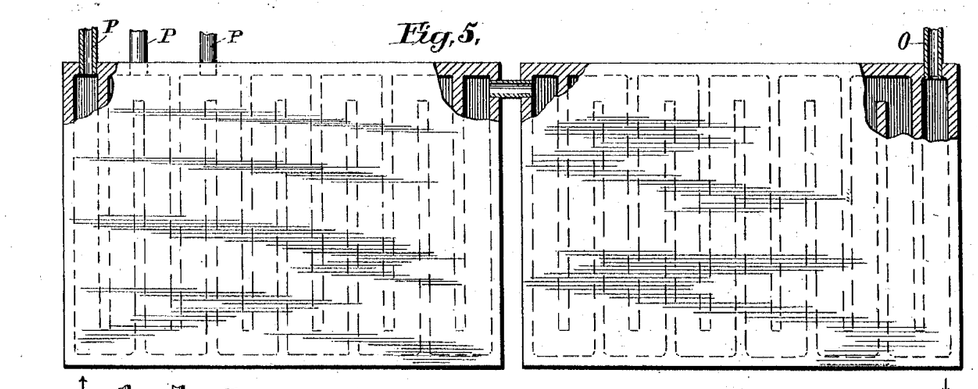
Fig. 5, a corresponding view showing a modified construction of the heater.

Fig. 5 shows a substitute construction of heater for that shown in Fig. 4, a continuous passage for the steam back and forth transversely across the heater from the inlet to the outlet end thereof being formed by the cored passages, separated by transverse partitions, as shown.

The heater-plates shown in Figs. 4 and 5 are the lower plates N N, whose upper surfaces, shown in said views, are planed and smoothly polished throughout, as are also the under surfaces of the plates M M of the upper heater. The plates of the lower heater may be secured in fixed position in the framework; but provision is made for raising and lowering the plates of the upper heater, as follows, reference being had to Figs. 1, 2, 3, and 6: Each of the plates M has firmly secured in the center of its upper side a vertical rod Q, which extends upward through a bearing R, formed upon and at the middle of a transverse cross-bar S of the framework. The upper ends of the rods Q are threaded and have screwed upon them nuts, forming the hubs of sprocket-wheels T, which nuts or hubs rest upon circles of antifriction-balls, seated in circular grooves formed in the upper ends of the bearings R. An endless sprocket-chain U, passed around the wheels T, provides a means for turning them in unison in either direction to raise or lower the plates M. Each of the plates M also has secured in its upper side near each of its four corners the lower end of a vertical rod V, whose upper end passes through a hole in a cross-bar W upon the top of the framework. The upper ends of the rods are threaded and have screwed upon them nuts X, which rest upon the upper sides of the bars W. By means of these rods V and their nuts X the plates M may be properly leveled and adjusted in relation to the lower plates N. The gravity of the plates M is sufficient to lower them whenever the slackening of the nuts T and X permits and likewise sufficient to maintain them in fixed relation to the lower plates N after they have been properly adjusted.

Figures 6, 7, 8, 9, 10:
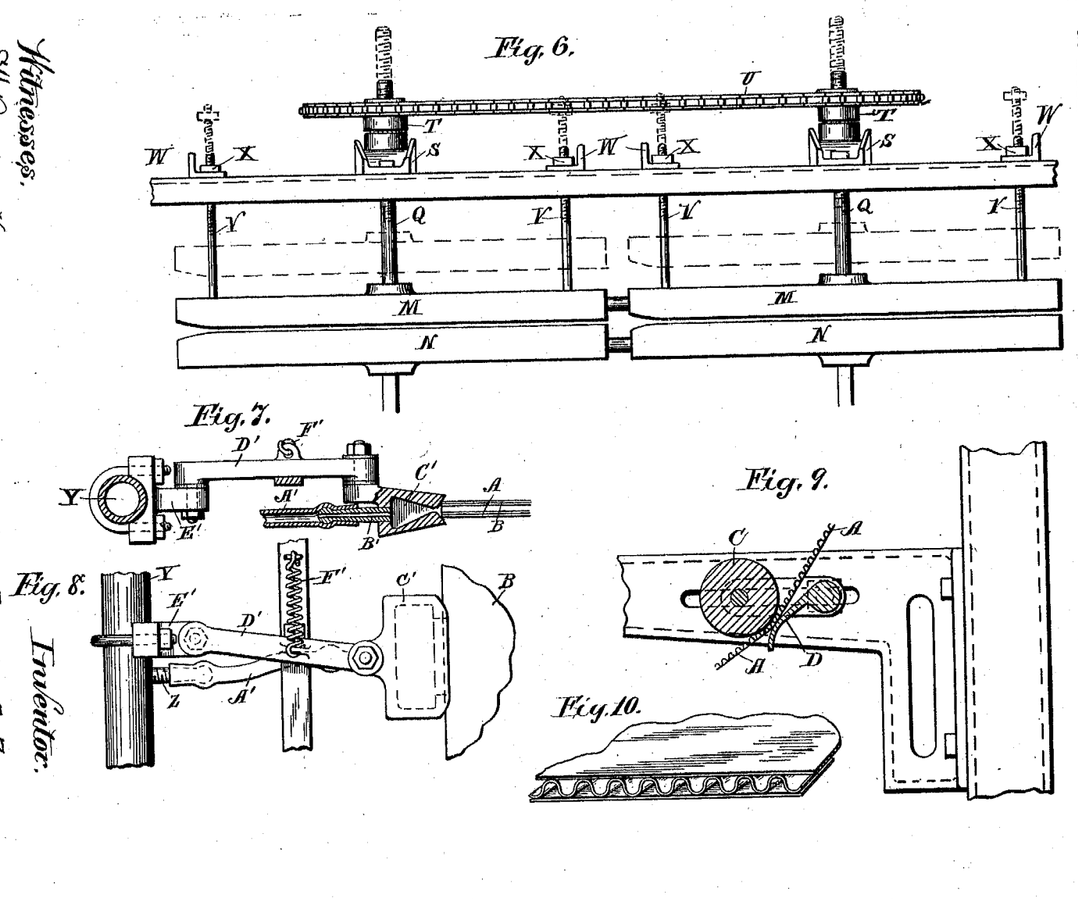
Fig. 6, a detail side elevation of the heaters with the means for raising and lowering and adjusting the upper heater.
Figs. 7 and 8, a detail vertical section and detail top plan view, respectively, of one of the devices for applying the air-blasts to the paper as it passes between the heaters.
Fig. 9, an enlarged detail view of the pressure devices for flattening the crowns of the corrugations preparatory to applying the paste to them.
Fig. 10, a sectional detail of the double-faced paper constituting the resulting product.

In first starting the machine with a new supply of paper the plates M will be lifted away from the plates N, as indicated by the dotted lines in Fig. 6, and the ends of the two paper strips pulled rearward between the heaters by hand and their ends engaged with the feeding devices in rear of the heaters. The upper heaters are then lowered and properly adjusted in relation to the lower heaters, and the machine is ready for operation, the feeding devices then serving to draw the strips of paper through the machine and between the heaters without interruption until the supply of paper is exhausted.

In order that the strips may be dried as rapidly as possible in their passage through the machine and to avoid the necessity of providing heaters of undue length, it is desirable to apply a high degree of heat to the strips in their passage between the heaters; but if the maximum degree of heat applicable to the strips for their final drying be applied to them at their point of entrance between the heaters when the paste is fresh upon them it will cook the paste instead of gradually drying it, with the result that the facing-strip will not be properly secured to the corrugated strip. I have therefore provided means for gradually increasing the degree of heat applied to the strips as they are drawn rearward between the heaters, applying the minimum degree to them at their entrance between the heaters, and gradually increasing it to the maximum degree at or near their point of exit. This I accomplish by the construction of the heaters illustrated in Figs. 4 and 5 and heretofore described. The live steam being admitted to the heater at its rear end and having to pass transversely back and forth through the body of the heater and travel a long distance before it reaches the forward exhaust end of the heater, it results that the heating efficiency of the steam will be gradually decreased from the inlet toward the exhaust end of the heater, thereby gradually decreasing the heat from the rear end to the front end of the heater. It results from this arrangement that while the rear ends of the heaters may be heated to the maximum degree desired for the final drying of the strips a considerably less degree of heat is applied to the strips as they first enter between the heaters, and as the paste is gradually dried an increasing degree of heat is applied until the maximum degree is reached.

The number of heaters used can be increased to any number desired. The more there are the more rapidly the paper can be drawn through the apparatus and dried, and the means for raising them can be provided for by putting two sprocket-wheels T on the middle screw Q and using two or more chains U.

It is sometimes desirable to apply more heat to one side of the strips than to the other as they pass between the heaters, and for this purpose I have provided means for increasing or decreasing at will the heating-surfaces to which the strips are exposed in their passage between the heaters, such means consisting in the supplemental exhaust-outlets P. (Shown in Figs. 4 and 5.) By opening the valve controlling any one of these exhausts, leaving the others closed, the portion of the heater at the left of such exhaust will be cut off from the circulation of steam and not be heated, thereby decreasing the heating-surface of such heater to a corresponding extent, with the result that a greater amount of heat will be applied to the opposite side of the strip as it passes between the heaters, assuming the opposite heater to have been left heated throughout its area.

To expel the moisture from the strips as they are passed through the heaters, I provide means for directing blasts of air transversely between the heaters in alternate opposite directions. To this end I lead along each side of the machine in about the horizontal plane of the passage between the heaters an air-pipe Y, connected with any suitable apparatus for forcing air therethrough, one end of each pipe being connected with such apparatus and the other end of the pipe being closed. These pipes are tapped at intervals and have nipples Z screwed into them, Fig. 8, which nipples are connected by short sections of flexible hose A' with other nipples B', Fig. 7, screwed into the outer sides of hollow shoes C'. These shoes C' are closed at their outer sides and opposite ends, but provided with longitudinal slits or narrow openings along their inner sides facing the machine, and these inner sides of the shoes bear against or rest adjacent to the edges of the paper strips as they pass between the heaters, Figs. 3, 7, and 8. The shoes C' may be mounted in fixed position adjacent the outer edges of the passage between the heaters; but to enable them to bear directly against the edges of the strips, as shown in Figs. 7 and 8, to more effectively direct the air through the strips longitudinally of their corrugations, but at the same time permit the shoes to yield to any outward pressure exerted against them by the strips in event the latter should occasionally be deflected to one side or the other of their regular path, I hinge the shoes upon the inner ends of arms D', whose outer ends are hinged to supports E', secured to the air-pipes Y, Figs. 7 and 8, coiled springs F', connected to the arms D', serving to pull them in a direction to yieldingly press the shoes C' inward against the edges of the paper.

Figure 3:
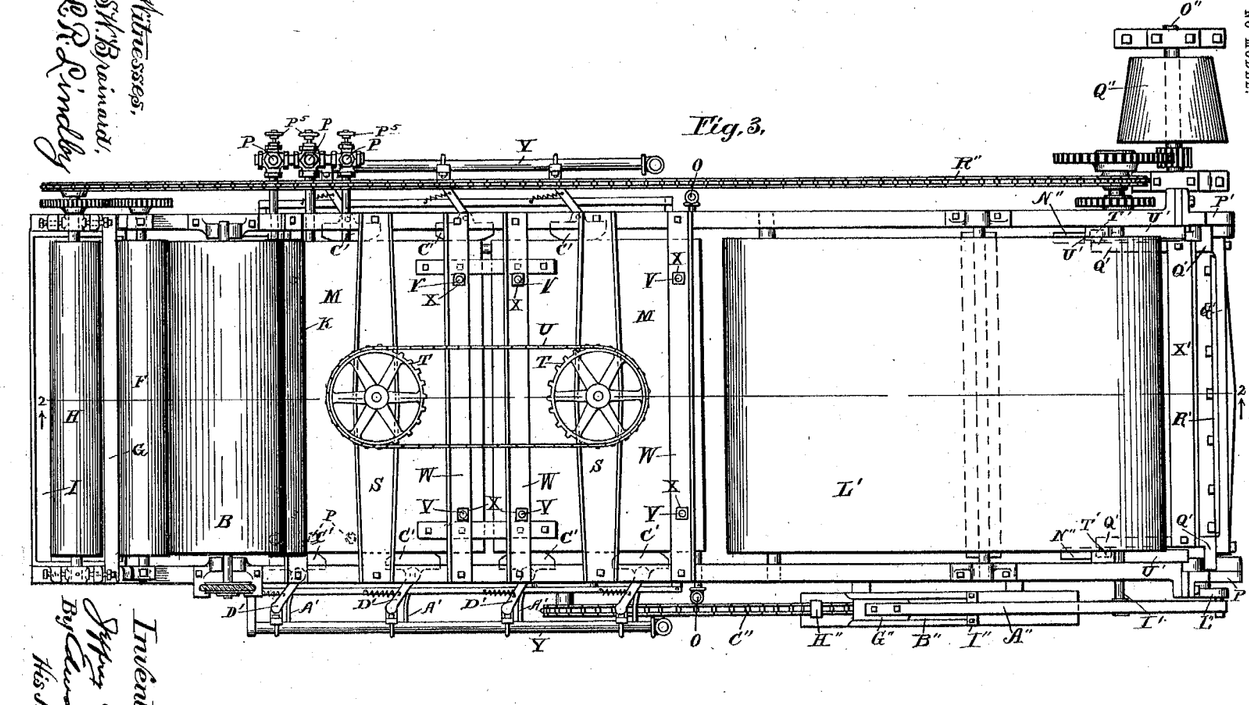
Fig. 3, a top plan view of the complete apparatus.

As shown in Fig. 3, the shoes C' upon opposite sides of the machine are arranged out of transverse line with each other, so that blasts of air will be constantly blown in opposite directions through the corrugations in the paper as the latter is drawn rearward through the heaters, thereby drying both edges of the paper equally. The same result of connecting the shoes C' with the air-pipes Y by means of the hinged supporting-arms D' and flexible pipes A' may be accomplished by connecting the shoes with the pipes after the manner of an ordinary hinged gas-fixture bracket and allowing the air to pass from the pipe through such hinged connections to the shoes.

Figure 14:
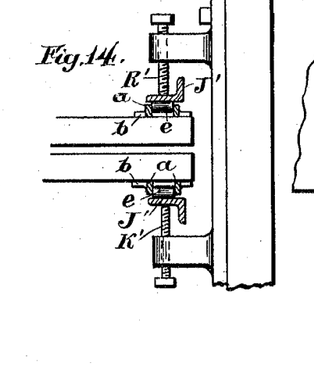
Fig. 14, a sectional detail showing the adjustable presser-bars between which the opposite edges of the feed-aprons pass.
Figure 15:
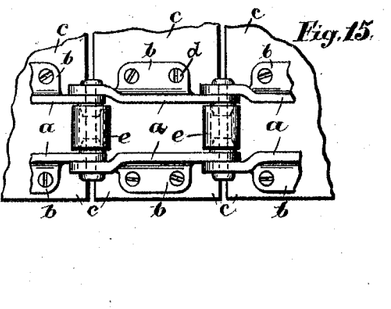
Fig. 15, an enlarged detail showing the construction of the sprocket-chains of the feed-aprons and the method of securing the slats of the feed-aprons to them, and Fig. 16 a detail view showing a modified construction of the feed-aprons.

Upon emerging from the rear ends of the heaters the strips of paper, now thoroughly dried and united, pass between the endless aprons G' G', Figs. 1 and 2, constituting the feeding devices for drawing the strips through the machine. These aprons are formed of slats placed transversely of the machine and secured at their opposite ends to endless sprocket-chains supported upon wheels carried by shafts I', suitably journaled in bearings upon the framework near its middle and at its rear end, as shown. The construction of the chains and the method of securing the slats to their links is shown in detail in Fig. 15, where $a$ represents the links of the chain, provided with lateral ears $b$, resting upon and secured to the ends of the slats $c$ of the apron by screws $d$. The chains are provided at the points of connection of their links with anti-friction-rollers $e$, which project slightly above the plane of the links. These rollers are adapted to coöperate with vertically-adjustable presser-bars J', vertically guided upon the framework of the machine, Figs. 2 and 14, and engaged by adjusting-screws K'. The outer edges of the apron G' pass beneath the upper presser-bars J' at the opposite sides of the machine, while the opposite edges of the lower apron pass over and travel upon the upper surfaces of the lower presser-bars J'. By adjusting the presser-bars J' by means of the screws K' the grip of the aprons G' upon the paper strips between them may be regulated as desired, it being necessary that the aprons shall maintain a sufficient grip upon the paper to draw it steadily forward through the machine, but care being taken that the pressure exerted upon the paper shall not be sufficient to crush it and break down the corrugations. To afford a smooth gripping-surface and increase the effectiveness of the grip of the aprons upon the paper, each of them is surrounded by an endless rubber belt or outer apron L', Figs. 1, 2, and 3. The upper apron G' passes at its middle over a vertically-adjustable supporting-roller M', mounted in bearings upon the top of the framework and which can be raised to take up the slack of the upper apron G', caused by wearing of the links in the chain, and the belt L' passes over and is supported by a second smaller roller N'.

Figure 16:
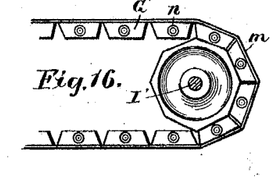

In Fig. 16 I have illustrated a modified construction of the feed-aprons G', where the slats are secured at their opposite ends to flexible belts $m$, which take the place of the sprocket-chains and are provided with anti-friction-rollers $n$, adapted to coöperate with the presser-bars J'. In this construction the supporting-wheels of the aprons, secured upon the shafts I', have their peripheries shaped to fit directly against and coöperate with the slats of the chain, as shown.

The drawing of the paper between the polished faces of the heater-plates, which press lightly against the paper and maintain its component strips in firm contact with each other, not only serves to dry the paper and secure its component strips together, but "irons" the opposite surfaces of the paper and gives them a smooth and perfect finish not attainable where the paper is dried between fixed heating-surfaces.

Figures 11, 12, 13:
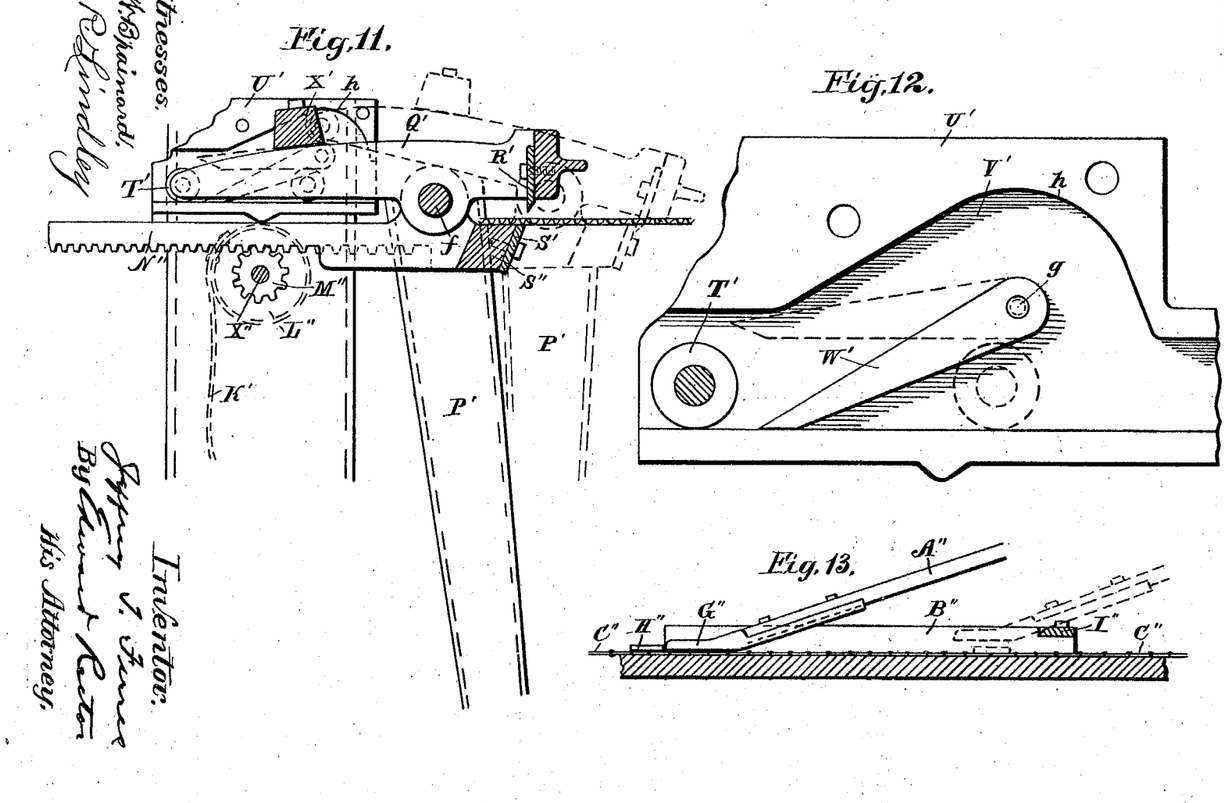
Fig. 11, an enlarged detail side elevation of the upper rear right-hand corner of the machine, showing the knife-carrying devices.
Fig. 12, a further detail view of the same parts.
Fig. 13, a detail side elevation of the front end of the arm which actuates the swinging knife-carrying frame.

From the rear end of the passage between the aprons G' the finished paper is delivered to the cutting devices, which may be now described, reference being had to Figs. 1, 2, 3, 11, 12, and 13. Hinged at its lower end to rearwardly-projecting bracket-arms O' upon the rear end of the framework is a frame P', adapted to be swung backward and forward at its upper end, said frame consisting of two vertical side arms P', rigidly connected with each other at their upper ends. Pivotally mounted near its middle in the upper end of this swinging frame upon a transverse rod $f$ is a rocking frame Q', which carries at its rear end a transverse knife-bar R', adapted to coöperate with a fixed knife-bar S', secured to the rear side of the cross-bar S'' of a second frame mounted upon the rod $f$ and having forwardly-extending side arms N'', Figs. 2 and 11, for a purpose hereinafter explained. When the front end of the rocking frame Q' is raised and its rear end thrown downward, the knife R will shear off the paper against the fixed knife S'. Each of the opposite arms of the rocking frame Q' carries at its forward end an outwardly-projecting stud T', (surrounded by an antifriction-sleeve,) which studs are adapted to coöperate with inclined surfaces and cams upon the fixed frame of the machine in such a way as to force the front end of the rocking frame Q' upward and its rear end downward as the upper end of the frame P' is swung rearward and to release the frame Q' and permit its forward end to be moved downward and its rear end upward as the upper end of the frame P' approaches its rearward limit of movement. As seen in Figs. 11 and 12, the main frame of the machine has secured to its opposite sides adjacent the front ends of the side arms of the rocking frame Q' plates U', provided with recesses V', having upwardly and rearwardly inclined walls terminating in downwardly and rearwardly curved portions, the bottom walls of the recesses being horizontal. Pivoted in each recess V' at $g$ is a downwardly and forwardly inclined guide-arm W', the under side of whose forward end is shaped to fit against and rest upon the horizontal bottom wall of the recess. This guide-arm W', in conjunction with the wall of the recess above and in rear of it, forms an upwardly and rearwardly inclined groove or guideway, terminating in a downwardly and rearwardly curved portion in rear of the arm W'. Now the studs T', projecting outwardly from the front ends of the side arms of the rocking frame Q', normally rest in the front ends of the recesses V' in the plates U' immediately forward of the front ends of the inclined guide-arms W'. When, therefore, the upper end of the frame P' is swung rearward, carrying the rocking frame Q' with it, the studs T', projecting from the latter, will ride upward over the inclined guide-arms W', and thereby rock the frame Q', forcing its front end upward and its rear end downward as the parts move rearwardly and causing the knife-bar R' to shear off the paper against the plate or knife-bar S', fixed to the bar S''. As the frame P' approaches the rear end of its movement the studs T' upon the front end of the frame Q' will pass beyond the upper rear ends of the guide-arms W' and contact with the downwardly-curved rear walls $h$ of the recesses V', which curved surfaces will act as cams upon the studs T' and force them downward, thereby rocking the frame Q' back toward normal position and throwing its rear end upward and disengaging the knife-bar R' from the rear edge of the paper. The swinging frame P' is then free to swing forward to normal position again under the stress of a spring connected to it and hereinafter described, and at its forward movement the studs T' upon the front end of the rocking frame Q' will ride under the guide-arms W' and lift them until they clear their forward ends, whereupon the arms W' will drop behind the studs T', ready for the next operation.

The rocking frame Q' is weighted in front of its pivot $f$, as by a cross-bar X', Figs. 3 and 11, or may have a spring connected to it to the more readily return it to normal position at the end of the rearward movement of the swinging frame P'.

It remains to describe the means by which the frame P' is swung rearward and the knife R' thus caused to travel with the paper while it is being actuated to sever it. Adjustably secured upon one side of the frame P', near its upper end, Fig. 1, is a disk Z', having projecting from it a stud Z'', over which fits an eye in a casting secured to the rear end of a forwardly-extending arm A'', whose front end rests in and is adapted to travel backwardly and forwardly of a trough or guideway B'', secured to the side of the framework, Figs. 1 and 13. This guideway B'' is open at its front and rear ends, and through it passes a sprocket-chain C'', mounted at its rear end upon a sprocket-wheel D'', secured to the lower one of the two rear shafts I', which support the feed-aprons, and at its forward end passing around a second sprocket-wheel E'', carried by a slide F'', secured to and adjustable longitudinally of the framework. The lower forward end of the arm A'' is in the present instance provided with a shoe G'', which rests upon the sprocket-chain C'' in the bottom of the guideway B''. The chain C'' has secured to it at equal distances from each other detachable cleats or blocks H'', adapted in the rearward movement of the chain C'' through the guideway B'' to contact with the lower forward end of the arm A'' and carry the latter rearward with the chain until it becomes disengaged from the block upon the chain by riding up over a transverse cross-piece I'' at the rear end of the guideway, whereupon the arm A'' is free to travel forward again over the chain C'' and remain at rest in normal forward position until engaged by another block H''.

Each rearward movement given the arm A'' in the manner and by the means above described will swing the frame P' rearward and cause the knife R' to sever the paper, and by placing the blocks H'' at the desired distance apart upon the chain C'' the knife may be actuated at proper intervals to cut the paper into pieces of any desired length.

The return forward movement of the swinging frame P' and its actuating-arm A'' is effected by means of a spring J'', Fig. 1, connected to the lower end of a strap K'', wound around a drum L'', fast upon a shaft X'', having secured to its opposite ends pinions M'', meshing with racks upon the under sides of the forwardly-extending side arms of the frame Q'', Figs. 2, 3, and 11. When the frame P' is swung rearward, the drum L'' is rotated and the strap K'' wound upon it and the spring J'' put under tension, and when the front end of the arm A'' is raised out of engagement with the block upon the chain C'' the spring J'' pulls the parts forward to normal position. In the present instance the swinging frame P' has secured to its upper end wooden buffers $i$, adapted to contact with the frame of the machine and arrest the parts without the shock of metal striking metal.

The purpose of making the disk Z' adjustable upon the frame P' is for the purpose of enabling the operation of the knife R' to be adjusted and timed through the medium of the arm A''. By adjusting the disk Z' in one direction the arm A'' will be projected forward, so that the blocks H'' upon the chain C'' will contact with its forward end at an earlier point in the rearward movement of the chain and the arm A″ and frame P′ be thus given a greater rearward movement before the front end of the arm is disengaged from the block on the chain than if the disk Z′ were adjusted in the opposite direction. It is desirable that the knife-bar R′ shall be thrown upward and disengaged from the paper just before the frame P′ completes its rearward movement, so that the knife may be moving rearward with the paper at the time of such disengagement, and therefore not form an obstruction to the rearward movement of the paper and tend to pull the latter upward with it as the knife rises. The desired timing of the operation of the knife in this respect may be effected by backward or forward adjustment of the connecting-point of the rear end of the arm A″ with the frame P′ by means of the adjustable disk Z′.

In the machine from which the drawings in the present instance have been made the arm A″ was of wood; hence the provision of the metal casting at its rear end engaging the stud Z″ upon the disk Z′ and the provision of the separate metal shoe G‴, secured to its forward end. The entire arm may of course be made of a single piece of metal.

The purpose of mounting the forward sprocket-wheel E″ upon the slide F‴, adjustable longitudinally of the framework, is to permit the chain C″ to be readily removed from its sprocket-wheels to permit attachment and detachment of the blocks H″ when it is desired to change the lengths of paper to be cut from the strips fed through the machine. By loosening the ends of the bolts connecting the slide F‴ with the framework the latter can be slid rearward sufficiently to permit the ready disengagement of the chain from the sprockets.

The driving-shaft of the machine is shown at O‴, Fig. 3, where it has secured upon it a taper pulley Q‴, by means of which the speed of the machine may be varied. The shafts I′, carrying the supporting-wheels for the feed-aprons G′, are driven by suitable gearing from the shaft O‴, (shown in Fig. 3,) while one of the shafts has secured upon it a sprocket-wheel, over which is passed a long sprocket-chain R‴, extending to the extreme forward end of the machine and there passed around a sprocket-wheel upon the spindle of the roller H to drive the latter, the rollers H and F being geared together, as shown in said view.

Having thus fully described my invention, I claim—

1. An apparatus for making double-faced corrugated paper, comprising means for drawing a strip of single-faced corrugated paper and a strip of facing-paper steadily through the apparatus, means for slightly flattening the crowns of the corrugations of the corrugated strip and applying paste thereto and then bringing the facing-strip into contact therewith, and means for maintaining proper contact of the two strips and applying heat to them as they are steadily drawn through the apparatus.

2. An apparatus for making double-faced corrugated paper, comprising means for drawing a strip of single-faced corrugated paper and a strip of facing-paper steadily through the apparatus, means for slightly flattening the crowns of the corrugations of the corrugated strip, means for applying paste to the crowns of the corrugations of the corrugated strip and bringing the facing-strip into contact therewith, and upper and lower stationary heaters having flat opposing surfaces between which and in direct contact with which the strips are continuously drawn and by which they are maintained in proper contact with each other and dried as they move through the apparatus.

3. An apparatus for making double-faced corrugated paper, comprising means for drawing a strip of single-faced corrugated paper and a strip of facing-paper steadily through the apparatus, means for slightly flattening the crowns of the corrugations of the corrugated strip, means for applying paste to the crowns of the corrugations of the corrugated strip and bringing the facing-strip into contact therewith, and an upper and lower heater of gradually-increasing temperature in the direction of movement of the strips, said heaters having flat opposing surfaces between which the strips are drawn and by which they are maintained in proper contact with each other and dried.

4. An apparatus for making double-faced corrugated paper, comprising means for drawing a strip of single-faced corrugated paper and a strip of facing-paper steadily through the apparatus, means for slightly flattening the crowns of the corrugations of the corrugated strip, means for applying paste to the crowns of the corrugations of the corrugated strip and bringing the facing-strip into contact therewith, upper and lower stationary heaters having flat opposing surfaces between which and in direct contact with which the strips are drawn, and means for directing air-blasts between said heaters transversely of the moving strips and through their corrugations.

5. An apparatus for making double-faced corrugated paper, comprising means for drawing a strip of single-faced corrugated paper and a strip of facing-paper steadily through the apparatus, means for slightly flattening the crowns of the corrugations of the corrugated strip, means for applying paste to the crowns of the corrugations of the corrugated strip and bringing the facing-strip into contact therewith, an upper and a lower heater of gradually-increasing temperature in the direction of movement of the strips and having flat opposing surfaces between which the strips are drawn and by which they are maintained in proper contact with each other, and means for directing air-blasts between the heaters transversely of the moving strips and through their corrugations.

6. An apparatus for making double-faced corrugated paper, comprising means for drawing a strip of single-faced corrugated paper and a strip of facing-paper steadily through the apparatus, means for slightly flattening the crowns of the corrugations of the corrugated strip, means for applying paste to the crowns of the corrugations of the corrugated strip and bringing the facing-strip into contact therewith, an upper and a lower heater having flat opposing surfaces between which the strips are drawn and by which they are held in proper contact with each other as they are drawn between said heaters and dried, and means for raising the upper heater to permit the initial introduction of the paper strips and their engagement with the means for drawing them through the apparatus.

7. An apparatus for making double-faced corrugated paper comprising means for drawing a strip of single-faced corrugated paper and a strip of facing-paper steadily through the apparatus, means for slightly flattening the crowns of the corrugations of the corrugated strip, means for applying paste to the crowns of the corrugations of the corrugated strip and bringing the facing-strip into contact therewith, an upper and a lower heater having flat opposing surfaces between which the strips are drawn and by which they are held in proper contact with each other as they are drawn between said heaters and dried, and means, independent of the operation of the apparatus, for raising and lowering the upper heater.

8. An apparatus for making double-faced corrugated paper, comprising means for drawing a strip of single-faced corrugated paper and a strip of facing-paper steadily through the apparatus, means for applying paste to the crowns of the corrugations of the corrugated strip and bringing the facing-strip into contact therewith, an upper and a lower heater having opposing surfaces between which the strips are drawn and by which they are maintained in proper contact with each other while being dried, said upper heater being composed of a plurality of independent horizontal plates or sections, and means for raising and lowering the several sections of the heater simultaneously and uniformly by a single operation.

9. The herein-described apparatus for making double-faced corrugated paper, comprising the upper and lower heaters M N having the flat opposing surfaces, the upper heaters being composed of a plurality of independent horizontal sections, the rolls for applying paste to the corrugated strip and bringing the facing-strip into contact therewith, and means in rear of the heaters M N for drawing the two strips steadily rearward between said heaters while the latter hold the strips in proper contact with each other and dry the same, substantially as described.

10. The herein-described apparatus for making double-faced corrugated paper, comprising the upper and lower heaters M N, the rolls for applying paste to the corrugated strip and bringing the facing-strip into contact therewith, means in rear of the heaters M N operating to draw the two strips steadily rearward through the heaters, the vertical screw-rods Q extending upward from the two sections of the upper heater through bearings upon the framework, the sprocket-wheels T threaded upon their upper ends above said bearings, and the chain U connecting said wheels, substantially as described.

11. The herein-described apparatus for making double-faced corrugated paper, comprising the upper and lower heaters M N, the rolls for applying paste to the corrugated strip and bringing the facing-strip into contact therewith, means in rear of the heaters M N operating to draw the two strips steadily rearward through the heaters, the vertical screw-rods Q extending upward from the two sections of the upper heater through bearings R upon the framework, the sprocket-wheels T threaded upon the rods Q above the bearings R, the antifriction-balls interposed between said bearings and the hubs of said wheels, and the chain U passed around the wheels, substantially as described.

12. The herein-described apparatus for making double-faced corrugated paper, comprising the upper and lower heaters M N, the rolls for applying paste to the corrugated strip and bringing the facing-strip into contact therewith, means in rear of the heaters M N operating to draw the two strips steadily rearward through the heaters, the vertical screw-rods Q extending upward from the two sections of the upper heater through bearings R upon the framework, the sprocket-wheels T threaded upon the rods Q above the bearings R, the antifriction-balls interposed between said bearings and the hubs of said wheels, the chain U passed around said wheels, and the rods V projecting vertically from the four corners of each of the heaters M N and extending through holes in the framework and provided on their upper ends with the nuts X, substantially as described.

13. The herein-described apparatus for making double-faced corrugated paper, comprising the upper and lower heaters M N, the rolls for applying paste to the corrugated strip and bringing the facing-strip into contact therewith, means in rear of the heaters M N for drawing the strips rearward between the heaters, the air-pipes Y Y at the opposite sides of the heaters, and the hollow shoes C' receiving air from the pipes Y Y and directing it between the heaters M N transversely of the strips, substantially as described.

14. The herein-described apparatus for making double faced corrugated paper, comprising the upper and lower heaters M N, the rolls for applying paste to the corrugated strip and bringing the facing-strip into contact therewith, means in rear of the heaters M N for drawing the strips rearward between the heaters, the air-pipes Y Y at the opposite sides of the heaters, and the hollow shoes C' receiving air from the pipes Y Y and yieldingly pressed toward the edges of the strips as they pass between the heaters, substantially as described.

15. The herein-described apparatus for making double-faced corrugated paper, comprising the upper and lower heaters M N, the rolls for applying paste to the corrugated strip and bringing the facing-strip into contact therewith, means in rear of the heaters M N for drawing the strips rearward between the heaters, the air-pipes Y Y at the opposite sides of the heaters, and the hollow shoes C' mounted upon hinged supports and receiving air from the pipes Y Y, and suitably-applied springs yieldingly pressing the shoes toward the edges of the strips between the heaters, substantially as described.

16. The herein-described apparatus for making double-faced corrugated paper, comprising the upper and lower heaters M N, the rolls for applying paste to the corrugated strip and bringing the facing-strip into contact therewith, means in rear of the heaters M N for drawing the strips rearward between the heaters, the hollow shoes C' connected by the hinged arms D' with supports upon the pipes Y Y, the flexible hose A' and nipples connecting the interior of the shoes with the interior of the pipes Y, and the springs F' connected to the arms D' and yieldingly pressing the shoes C' toward the heaters, substantially as described.

17. In an apparatus for making double-faced corrugated paper, the combination with paste-applying mechanism, of a pair of flat-surfaced heater-plates between which the paper is passed for the purpose of gradually drying the same, each of said plates consisting of a flat metal body containing a continuous steam-passage extending transversely back and forth throughout its length, to the rear end of which passage the steam for heating the plate is admitted and from the forward end of which the steam is exhausted, whereby the plate is heated to a gradually-increasing temperature in the direction of motion of the paper between the plates.

18. In an apparatus for making double-faced corrugated paper, the combination with paste-applying mechanism, of a pair of flat-surfaced heater-plates between which the paper is passed for the purpose of gradually drying the same, each of said plates consisting of a flat metal body containing a continuous steam-passage extending transversely back and forth throughout its length, to the rear end of which passage the steam for heating the plate is admitted and from the forward end of which the steam is exhausted, and one or both of said plates being provided toward its forward end with supplemental exhausts by which the area of the surface of the plate heated by the steam may be varied.

19. In an apparatus for making double-faced corrugated paper, the combination with paste-applying mechanism, of a pair of flat-surfaced heater-plates between which the paper is passed for the purpose of gradually drying the same, each of said plates consisting of a flat metal body having a series of transverse steam-pipes cast directly in it, with their ends at the opposite edges of the plate suitably connected to form a continuous steam-passage extending back and forth through the plate throughout its length, for the purpose described.

20. In combination with paste-applying mechanism, the herein-described heater-plate composed of the flat metal body having the steam-passage extending transversely back and forth through its length for the purpose of heating the plate at a gradually-increasing temperature from the exhaust end of said steam-passage to its inlet end, and said steam-passage being provided at its exhaust end with a plurality of exhaust-outlets by means of which the area of the plate heated by the steam may be varied.

21. In apparatus for making double-faced corrugated paper, the combination of the paste-applying mechanism of the herein-described heater-plate for drying the paste applied to the paper and consisting of the flat metal body having a series of transverse steam-pipes cast directly in it, with their outer ends projecting beyond the edges of the plate and suitably connected to form a continuous steam-passage extending back and forth transversely of the plate from end to end thereof.

22. In apparatus for making double-faced corrugated paper, the combination with paste-applying mechanism, the heater-plates M M N N for drying the paste applied to the paper, each of said plates consisting of the flat metal body having the steam-passage extending back and forth transversely of it throughout its length, the passage in the upper plates M M being connected at the adjacent ends of said plates to form a continuous passage throughout the two plates and the passages in the lower plates N N being likewise connected at the adjacent ends of said plates to form a continuous passage throughout the lower plates, and means for simultaneously raising and lowering the upper plates M M uniformly relatively to the lower plates N N.

23. In an apparatus for making double-faced corrugated paper, the combination with paste-applying mechanism of a pair of flat-surfaced heater-plates between which the paper is passed to dry the same, of a pair of power-driven endless aprons located in rear of the heater-plates and adapted to receive the paper between them and draw it rearward from the heaters and deliver it at the rear end of the apparatus.

24. In an apparatus for making double-faced corrugated paper, the combination with paste-applying mechanism of a pair of flat-surfaced heater-plates between which the paper is passed to dry the same, of a pair of power-driven endless aprons located in rear of the heater-plates and adapted to receive the paper between them and draw it rearward from the heaters and deliver it at the rear end of the apparatus and means for regulating the pressure of said aprons upon the paper while passing between them.

25. In an apparatus for making double-faced corrugated paper, the combination with paste-applying mechanism of a pair of flat-surfaced heater-plates between which the paper is passed to dry the same, of a pair of power-driven endless aprons located in rear of the heater-plates and adapted to receive the paper between them and draw it rearward from the heaters and deliver it at the rear end of the apparatus each of said aprons being composed of transverse slats secured at their opposite ends to chains passing over and supported by wheels at the front and rear ends of the paths of the aprons.

26. In an apparatus for making double-faced corrugated paper, the combination with paste-applying mechanism of a pair of flat-surfaced heater-plates between which the paper is passed to dry the same, of a pair of power-driven endless aprons located in rear of the heater-plates and adapted to receive the paper between them and draw it rearward from the heaters and deliver it at the rear end of the apparatus, each of said aprons being composed of transverse slats secured at their opposite ends to chains passing over and supported by wheels at the front and rear ends of the paths of the aprons, and adjustable presser-bars coöperating with one or both aprons to regulate the pressure exerted by them on the paper as it passes between them.

27. In an apparatus for making double-faced corrugated paper, the combination with paste-applying mechanism of a pair of flat-surfaced heater-plates between which the paper is passed to dry the same, of a pair of power-driven endless aprons located in rear of the heater-plates and adapted to receive the paper between them and draw it rearward from the heaters and deliver it at the rear end of the apparatus, each of said aprons being composed of transverse slats secured at their opposite ends to chains passing over and supported by wheels at the front and rear ends of the paths of the aprons, the chains of one or both aprons being provided with antifriction-rollers at the junctions of its links, and adjustable presser-bars engaging said rollers and by means of which the pressure of the aprons upon the paper passing between them may be regulated.

28. The combination with paste-applying mechanism and with the heaters M, N, of the power-driven endless aprons G' arranged in rear thereof and each composed of the transverse slats $c$ secured at their opposite ends to the links $a$ of sprocket-chains supported upon wheels carried by the shafts I' substantially as described.

29. The combination with paste-applying mechanism and with the heaters M, N, of the power-driven endless aprons G' arranged in rear thereof and each composed of the transverse slats $c$ secured at their opposite ends to the links $a$ of sprocket-chains supported upon wheels carried by the shafts I', said chains being provided with the antifriction-rollers $e$, and the adjustable presser-bars J' coöperating with the rollers $e$ to regulate the pressure of the aprons upon the paper passed between them, substantially as described.

30. The combination, in an apparatus of the class described, of paste-applying mechanism and the endless power-driven aprons G' composed of the transverse slats and sprocket-chains, of the outer aprons or belts L' surrounding the aprons G' and composed of material forming a smooth and efficient gripping-surface to engage the paper passed between the aprons.

31. The combination, in an apparatus of the class described, of paste-applying mechanism and the power-driven endless aprons G' composed of the transverse slats and sprocket-chains, of the outer aprons or belts L' surrounding the aprons G' and composed of material forming a smooth and efficient gripping-surface to engage the paper passed between the aprons, the roller M' for supporting the upper apron G' in its forward passage from its rear supporting-wheels to its forward ones, and the roller N' above the roller M' for supporting the belt L' above the apron G', substantially as described.

32. The combination, in apparatus of the class described, of paste-applying mechanism, with means for drawing the paper through the apparatus and delivering it from the rear end thereof, of a backwardly and forwardly movable knife-carrying frame, a transverse vertically-reciprocating knife mounted in said frame, means for operating said knife to sever the paper and retract it therefrom during the rearward movement of the frame, and means for automatically moving said frame rearward with the paper and returning it to normal position at predetermined intervals.

33. The combination, in apparatus of the class described, of paste-applying mechanism, with means for drawing the paper through the apparatus and delivering it from the rear end thereof, of a backwardly and forwardly movable knife-carrying frame, a transverse vertically-reciprocating knife mounted in said frame, means for operating said knife to sever the paper and retract it therefrom during the rearward movement of the frame, and adjustable means for automatically moving said frame rearward with the paper and returning it to normal position at predetermined intervals, which intervals may be varied as desired to regulate the lengths of paper cut from the strips issuing from the apparatus.

34. The combination, in apparatus of the class described, of paste-applying mechanism, with means for drawing the paper through the apparatus and delivering it from the rear end thereof, of a backwardly and forwardly movable knife-carrying frame, a transverse vertically-reciprocating knife mounted therein, means actuated by the rearward movement of the frame for operating the knife to sever the paper during the rearward movement of the frame, and means for automatically moving the frame rearward with the paper and returning it to normal position at predetermined intervals.

35. The combination, in apparatus of the class described, of paste-applying mechanism, with means for drawing the paper through the apparatus and delivering it from the rear end thereof, of a backwardly and forwardly movable knife-carrying frame, a transverse vertically-reciprocating knife mounted therein, means actuated by the rearward movement of the frame for operating the knife to sever the paper and retract and disengage it therefrom during the rearward movement of the frame, and means for automatically moving the frame rearward with the paper and returning it to normal position at predetermined intervals.

36. The combination, in apparatus of the class described, of paste-applying mechanism, with means for drawing the paper through the apparatus and delivering it from the rear end thereof, of a backwardly and forwardly movable knife-carrying frame, a transverse vertically-reciprocating knife mounted therein, means actuated by the rearward movement of the frame for operating the knife to sever the paper and retract and disengage it therefrom during the rearward movement of the frame, and adjustable means for automatically moving the frame rearward with the paper and returning it to normal position at predetermined intervals, which intervals may be varied as desired by adjustment of said means.

37. The combination, in apparatus of the class described, of paste-applying mechanism, with means for drawing the paper rearward through the apparatus and delivering it from the rear end thereof, of a backwardly and forwardly movable knife-carrying frame, a transverse vertically-reciprocating knife mounted in said frame, cams upon the fixed frame of the machine coöperating with the movable support of said knife to operate the latter to sever the paper as the knife is carried rearward by its frame, with the paper, and means for automatically moving said frame rearward and returning it to normal position at predetermined intervals.

38. The combination, in apparatus of the class described, of paste-applying mechanism, with means for drawing the paper rearward through the apparatus and delivering it from the rear end thereof, of a backwardly and forwardly movable knife-carrying frame, a transverse vertically - reciprocating knife mounted upon a rocking support in said frame, cams upon the fixed frame coöperating with said rocking support to operate the knife to sever the paper during the rearward movement of the movable frame, and means for automatically moving said frame rearward and returning it to normal position at predetermined intervals.

39. In apparatus of the class described having paste - applying mechanism and paper-feeding mechanism, the combination of the backwardly and forwardly movable knife-carrying frame having the transverse shearing-blade S', the rocking frame Q' mounted therein and having at one end the knife R' adapted to coöperate with the blade or knife S' and at its opposite end provided with the studs T' coöperating with the recesses V' and pivoted guides W' on the fixed frame of the machine, and means for automatically moving the first-mentioned frame backward and forward at predetermined intervals.

40. In apparatus of the class described having paste - applying mechanism and paper-feeding mechanism, the combination of the knife-carrying frame P' hinged to a support at its lower end and adapted to be swung forward and backward to and from the delivery end of the apparatus at its upper end, the coöperating knives R' S' mounted in said frame, means for moving the knife R' into coöperation with the knife S' as the frame P' is swung rearward, to sever the paper as the knives move rearward with the paper, and means for swinging the upper end of the frame P' backward and forward at predetermined intervals.

41. In apparatus of the class described having paste - applying mechanism and paper-feeding mechanism, the combination of the knife-carrying frame P' hinged to a support at its lower end and adapted to be swung forward and backward to and from the delivery end of the apparatus at its upper end, the coöperating knives R' S' mounted in said frame, means actuated by the rearward movement of the frame P' for moving the knife R' into coöperating with the knife S', to sever the paper as the knives move rearward with the paper, and means for swinging the upper end of the frame P' backward and forward at predetermined intervals.

42. In apparatus of the class described having paste - applying mechanism and paper-feeding mechanism, the combination of the knife-carrying frame P' hinged to a support at its lower end and adapted to be swung forward and backward to and from the delivery end of the apparatus at its upper end, the frames Q' Q'' mounted in the frame P', the knives R' S' carried by the frames Q' Q'' and coöperating with each other, the plates U' upon the fixed framework at the opposite sides of the forward portion of the rocking frame Q', the guides W' pivoted in the recesses V' in the plates U', the studs T' projecting from the opposite sides of the rear end of the rocking frame Q' and coöperating with the recesses V' and pivoted guides W' in the plates U', and means for swinging the upper end of the frame P' backward and forward.

43. The combination, in apparatus of the class described, of paste-applying mechanism, with means for drawing the paper rearward through the apparatus and delivering it therefrom, of a backwardly and forwardly movable knife-carrying frame, a transverse vertically-reciprocating knife mounted therein, means for operating said knife to sever the paper during the rearward movement of said frame, an endless power-driven chain or belt, means intermediate said chain and a backwardly and forwardly movable frame for moving the latter backward and releasing it at predetermined intervals, and means for moving the frame forward to normal position when released.

44. The combination, in apparatus of the class described, of paste-applying mechanism, with means for drawing the paper rearward through the apparatus and delivering it therefrom, of a backwardly and forwardly movable knife-carrying frame, a transverse vertically-reciprocating knife mounted therein, means for operating said knife to sever the paper during the rearward movement of said frame, an endless power-driven chain or belt provided with projections located at regular intervals in its length, an arm connected at one end to the backwardly and forwardly movable frame and at its opposite end coöperating with the projections upon said chain to move said frame rearward and release it at regular intervals, and means for moving the frame forward to normal position when released.

45. The combination, in apparatus of the class described, of paste-applying mechanism, with means for drawing the paper rearward through the apparatus and delivering it therefrom, of a backwardly and forwardly movable knife-carrying frame, a transverse vertically-reciprocating knife mounted therein, means for operating said knife to sever the paper during the rearward movement of said frame, an endless power-driven chain or belt, detachable projections secured upon said chain at regular intervals, an arm connected at one end to the backwardly and forwardly movable frame and coöperating at its opposite end with the projections on said chain, to move said frame backward and release it at regular intervals determined by the number and arrangement of the projections attached to the chain, and means for moving the frame forward to normal position when released.

46. In apparatus of the class described having paste-applying mechanism and paper-feeding mechanism, the combination, with the backwardly and forwardly movable knife-carrying frame P', of the endless chain C" provided with the cleats or projections H", the arm A" pivoted at its rear end to the knife-carrying frame and at its forward end coöperating with the cleats H" on the chain C" and with the releasing member I" for disengaging it from said cleats, and means for returning the knife-carrying frame to normal position.

47. In apparatus of the class described having paste-applying mechanism and paper-feeding mechanism, the combination of the backwardly and forwardly movable knife-carrying frame P', the endless chain C" provided with the detachable cleats or projections H" and passing through the guideway B", the arm A" pivoted at its rear end to the frame P' and at its forward end moving backward and forward in the guideway B" and coöperating with the projections H" on the chain C" and with the releasing member I", and means for returning the frame P' to normal position.

48. In apparatus of the class described having paste-applying mechanism and paper-feeding mechanism, the combination of the backwardly and forwardly movable knife-carrying frame P', the transverse vertically-reciprocating knife mounted therein and operated by the rearward movement of the frame to sever the paper and be retracted from engagement therewith, the endless power-driven chain C" having the projections H", the arm A" adjustably pivoted at its rear end to the frame P' and coöperating at its forward end with the projections H" upon the chain C" and with the releasing member I", and means for returning the frame P' to its normal position.

49. In apparatus of the class described having paste-applying mechanism and paper-feeding mechanism, the combination of the backwardly and forwardly movable knife-carrying frame P', the transverse vertically-reciprocating knife R' mounted therein and operated by the movement of the frame to sever the paper and be retracted from engagement therewith, the adjustable disk Z' secured to the frame P' and having the stud Z", the endless power-driven chain C" having the projections H", the arm A" provided at its rear end with an eye fitting the stud Z" on the disk Z' and coöperating at its forward end with the projections H" on the chain C" and with the releasing member I", and means for returning the frame P' to normal position.

50. In an apparatus for making double-faced corrugated paper, the combination, with the paste-applying rolls, of the roller C and presser-plate D located in advance thereof and operating to slightly flatten the crowns of the corrugations preparatory to applying paste to them.

JEFFREY T. FERRES.

Witnesses:
ABE RHOADS,
E. B. WALKER.